(12) United States Patent
Li et al.

(10) Patent No.: US 12,444,244 B2
(45) Date of Patent: Oct. 14, 2025

(54) DRIVING DECISION-MAKING METHOD AND APPARATUS AND CHIP

(71) Applicant: HUAWEI TECHNOLOGIES CO., LTD., Guangdong (CN)

(72) Inventors: Dong Li, Beijing (CN); Bin Wang, Beijing (CN); Wulong Liu, Montreal (CA); Yuzheng Zhuang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 215 days.

(21) Appl. No.: 18/145,557

(22) Filed: Dec. 22, 2022

(65) Prior Publication Data
US 2023/0162539 A1    May 25, 2023

Related U.S. Application Data

(63) Continuation of application No. PCT/CN2021/090365, filed on Apr. 27, 2021.

(30) Foreign Application Priority Data

Jun. 23, 2020 (CN) .......................... 202010584738.2

(51) Int. Cl.
     *G07C 5/02*      (2006.01)
     *B60W 50/06*      (2006.01)
     (Continued)

(52) U.S. Cl.
     CPC ............... *G07C 5/02* (2013.01); *B60W 50/06* (2013.01); *G06N 7/01* (2023.01); *B60W 2050/0018* (2013.01); *B60W 60/001* (2020.02)

(58) Field of Classification Search
None
See application file for complete search history.

(56) References Cited

U.S. PATENT DOCUMENTS

| 2010/0138368 A1 | 6/2010 | Stundner et al. |
| 2013/0185039 A1 | 7/2013 | Tesauro et al. |

(Continued)

FOREIGN PATENT DOCUMENTS

| CN | 108446727 A | 8/2018 |
| CN | 108803609 A | 11/2018 |

(Continued)

OTHER PUBLICATIONS

Carl-Johan Hoel, et al., Combining Planning and Deep Reinforcement Learning in Tactical Decision Making for Autonomous Driving, Jun. 2020, IEEE Transactions on intelligent vehicles, vol. 5, No. 2 pp. 294-305 (Year: 2020).*

(Continued)

*Primary Examiner* — Hongye Liang
(74) *Attorney, Agent, or Firm* — Fish & Richardson P.C.

(57) ABSTRACT

The present disclosure relates to driving decision-making methods, apparatuses, and chips. One example method includes building a Monte Carlo tree based on a current driving environment state, where the Monte Carlo tree includes a root node and N−1 non-root nodes, each node represents one driving environment state, and a driving environment state represented by any non-root node is predicted by a stochastic model of driving environments. Based on at least one of an access count or a value function of each node in the Monte Carlo tree, a node sequence that starts from the root node and ends at a leaf node is determined, and a driving action sequence is determined based on a driving action corresponding to each node in the node sequence.

18 Claims, 5 Drawing Sheets

(51) Int. Cl.
*G06N 7/01* (2023.01)
*B60W 50/00* (2006.01)
*B60W 60/00* (2020.01)

(56) References Cited

U.S. PATENT DOCUMENTS

| | | | |
|---|---|---|---|
| 2018/0089563 A1* | 3/2018 | Redding | G06N 5/01 |
| 2020/0150672 A1 | 5/2020 | Naghshvar et al. | |

FOREIGN PATENT DOCUMENTS

| | | | |
|---|---|---|---|
| CN | 108897928 A | | 11/2018 |
| CN | 108985458 A | | 12/2018 |
| CN | 106169188 B | | 1/2019 |
| CN | 109598934 A | | 4/2019 |
| CN | 109858553 A | | 6/2019 |

OTHER PUBLICATIONS

Hoel et al., "Combining Planning and Deep Reinforcement Learning in Tactical Decision Making for Autonomous Driving," IEEE Transactions on Intelligent Vehicles, May 6, 2019, 12 pages.

Cai et al., "HyP-DESPOT: A Hybrid Parallel Algorithm for Online Planning under Uncertainty," CoRR, submitted on Feb. 17, 2018, arXiv:1802.06215v1, 9 pages.

Jiang et al., "Feedback-Based Tree Search for Reinforcement Learning," CoRR, submitted on May 15, 2018, arXiv:1805.05935v1, 19 pages.

Xu et al., "Cooperative Driving at Unsignalized Intersections Using Tree Search," IEEE Transactions on Intelligent Tranportation Systems, vol. 21, No. 11, Nov. 2020, 9 pages.

Extended European Search Report in European Appln No. 21829106.0, dated Oct. 16, 2023, 10 pages.

Office Action in Japanese Appln. No. 2022-578790, mailed on Apr. 2, 2024, 4 pages (with English translation).

Sunberg et al., "The Value of Inferring the Internal State of Traffic Participants for Autonomous Freeway Driving," Paper, Presented at Proceedings of the 2017 American Control Conference, May 24-26, 2017, 7 pages.

Peeta et al., "Adaptability of a Hybrid Route Choice Model to Incorporating Driver Behavior Dynamics Under Information Provision," IEEE Transactions on Systems, Man, and Cybernetics—Part A: Systems and Humans, Mar. 2004, 34(2):243-256.

Schulz et al., "Interaction-Aware Probabilistic Behavior Prediction in Urban Environments," Paper, Presented at Proceedings of the 2018 IEEE/RSJ International Conference on Intelligent Robots and Systems (IROS), Oct. 1-5, 2018, 8 pages.

Office Action in Indian Appln. No. 2022-17075925, mailed on Jun. 6, 2025, 10 pages.

* cited by examiner

DRIVING DECISION-MAKING METHOD AND APPARATUS AND CHIP

CROSS-REFERENCE TO RELATED APPLICATIONS

This application is a continuation of International Application No. PCT/CN2021/090365, filed on Apr. 27, 2021, which claims priority to Chinese Patent Application No. 202010584738.2, filed on Jun. 23, 2020. The disclosures of the aforementioned applications are hereby incorporated by reference in their entireties.

TECHNICAL FIELD

Embodiments of this application relate to the field of autonomous driving, and in particular, to a driving decision-making method and apparatus and a chip.

BACKGROUND

With the dawning of an autonomous driving era, smart vehicles with an autonomous driving function become a focus of research of various manufacturers. Currently, autonomous driving includes assisted driving and fully autonomous driving. Key technologies for implementing autonomous driving include environmental perception, driving decision-making, execution control, and the like. Driving decision-making provides, based on perceived information about a traffic participant, a driving action for a vehicle to execute.

Currently, driving decision-making is usually implemented based on a reinforcement learning (deep Q network, DQN) algorithm. A DQN model built by using the DQN algorithm learns driving environment states (for example, a velocity of a current vehicle and a velocity of a neighboring vehicle) of a large quantity of vehicles at a moment and a driving action (for example, changing to a left lane or changing to a right lane) output by a vehicle driver based on a driving environment state at the moment. During driving decision-making, a driving action that an autonomous driving vehicle needs to execute can be obtained by using the DQN model and based on a current driving environment state of the vehicle.

However, in driving decision-making based on the DQN model, when a driving action is output, impact of the driving action on subsequent driving of the vehicle is not considered. This can hardly ensure an optimal output decision-making result.

SUMMARY

Embodiments of this application provide a driving decision-making method and apparatus and a chip, to improve robustness of a driving decision-making policy and ensure an optimal output decision-making result.

According to a first aspect, an embodiment of this application provides a driving decision-making method. The method includes: building a Monte Carlo tree based on a current driving environment state, where the Monte Carlo tree includes N nodes, each node represents one driving environment state, the N nodes include a root node and N−1 non-root nodes, the root node represents the current driving environment state, a driving environment state represented by a first node is predicted by using a stochastic model of driving environments based on a driving environment state represented by a parent node of the first node and based on a first driving action, the first driving action is a driving action determined by the parent node of the first node in a process of obtaining the first node through expansion (in other words, the first driving action serves as a driving action by which the parent node of the first node obtains the first node through expansion), the first node is any node of the N−1 non-root nodes, and N is a positive integer greater than or equal to 2; determining, in the Monte Carlo tree based on an access count and/or a value function of each node in the Monte Carlo tree, a node sequence that starts from the root node and ends at a leaf node; and determining a driving action sequence based on a driving action corresponding to each node included in the node sequence, where the driving action sequence is used for driving decision-making. The access count of each node is determined based on access counts of subnodes of the node and an initial access count of the node, the value function of each node is determined based on value functions of subnodes of the node and an initial value function of the node, the initial access count of each node is 1, and the initial value function is determined based on a value function that matches a driving environment state represented by the node.

By using the foregoing method, the stochastic model of driving environments may be used to predict various driving environment states that a plurality of driving actions of an autonomous driving vehicle may face in a future period of time, to build a Monte Carlo tree; and a driving action sequence most favorable for vehicle driving is determined based on the various driving environment states that the plurality of driving actions of the autonomous driving vehicle may face the future period of time. This improves robustness of a driving decision-making policy and helps to ensure an optimal output decision-making result.

In a possible design, that a driving environment state represented by a first node is predicted by using a stochastic model of driving environments based on a driving environment state represented by a parent node of the first node and based on a first driving action includes: predicting, through dropout-based forward propagation by using the stochastic model of driving environments, a probability distribution of a driving environment state after the first driving action is executed based on the driving environment state represented by the parent node of the first node; and obtaining the driving environment state represented by the first node through sampling from the probability distribution.

In the foregoing design, the probability distribution of the driving environment state after the first driving action is executed based on the driving environment state represented by the parent node of the first node is predicted through dropout-based forward propagation by using the stochastic model of driving environments, and the driving environment state represented by the first node is obtained through sampling from the probability distribution. In this way, uncertainty of a driving environment state is fully considered when a node is expanded in the Monte Carlo tree. This increases diversity of node expansion and makes a driving decision-making policy more robust.

In a possible design, that the initial value function of a node is determined based on a value function that matches a driving environment state represented by the node includes: selecting, from an episodic memory, a first quantity of target driving environment states that have a highest matching degree with the driving environment state represented by the node; and determining the initial value function of the node based on value functions respectively corresponding to the first quantity of target driving environment states.

In the foregoing design, an episodic memory is introduced to the Monte Carlo tree. In this way, an initial value function of a node can be accurately and rapidly estimated based on historical empirical data, instead of being estimated in an inefficient expansion manner. This reduces calculation overheads brought by estimation of an initial value function of a node and helps improve efficiency of Monte Carlo tree search.

In a possible design, the method further includes: after the first driving action in the driving action sequence is executed, obtaining an actual driving environment state after the first driving action is executed; and updating the stochastic model of driving environments based on the current driving environment state, the first driving action, and the actual driving environment state after the first driving action is executed.

In the foregoing design, the stochastic model of driving environments can be continuously trained and updated. This helps improve accuracy of the stochastic model of driving environments.

In a possible design, the determining, in the Monte Carlo tree based on an access count and/or a value function of each node in the Monte Carlo tree, a node sequence that starts from the root node and ends at a leaf node includes: determining, in the Monte Carlo tree based on the access count of each node in the Monte Carlo tree according to a maximum access count rule, a node sequence that starts from the root node and ends at a leaf node; determining, in the Monte Carlo tree based on the value function of each node in the Monte Carlo tree according to a maximum value function rule, a node sequence that starts from the root node and ends at a leaf node; or determining, in the Monte Carlo tree based on the access count and the value function of each node in the Monte Carlo tree according to a "maximum access count first, maximum value function next" rule, a node sequence that starts from the root node and ends at a leaf node.

In the foregoing design, a plurality of manners are provided for determining a node sequence. This helps meet different driving decision-making requirements.

In a possible design, the method further includes: when a driving episode ends, determining a cumulative reward return value corresponding to an actual driving environment state after each driving action in the driving episode is executed; and updating the episodic memory by using, as a value function corresponding to the actual driving environment state, the cumulative reward return value corresponding to the actual driving environment state after each driving action is executed.

In the foregoing design, the episodic memory is updated based on the cumulative reward return value. This is conducive to accurately determining an initial value function of a node in the Monte Carlo tree, thereby ensuring reliability of an output decision-making result.

According to a second aspect, an embodiment of this application provides a driving decision-making apparatus, including a unit configured to perform each step in any one of the first aspect or the possible designs of the first aspect.

According to a third aspect, an embodiment of this application provides a driving decision-making apparatus, including a processor and a memory. The memory is configured to store a computer program or instructions. The processor is configured to call the computer program or instructions stored in the memory to perform the method any one of the first aspect or the possible designs of the first aspect.

According to a fourth aspect, an embodiment of this application provides a computer readable storage medium. The computer readable storage medium has a computer program or instructions for performing the method any one of the first aspect or the possible designs of the first aspect.

According to a fifth aspect, an embodiment of this application provides a computer program product, including a computer program or instructions. When the computer program or instructions are executed, the method any one of the first aspect or the possible designs of the first aspect can be implemented.

According to a sixth aspect, an embodiment of this application provides a chip. The chip is configured to implement the method any one of the first aspect or the possible designs of the first aspect.

For technical effects that can be achieved in the second aspect to the sixth aspect, refer to the technical effects that can be achieved in the first aspect. Details are not described herein again.

DESCRIPTION OF EMBODIMENTS

Figure 1:
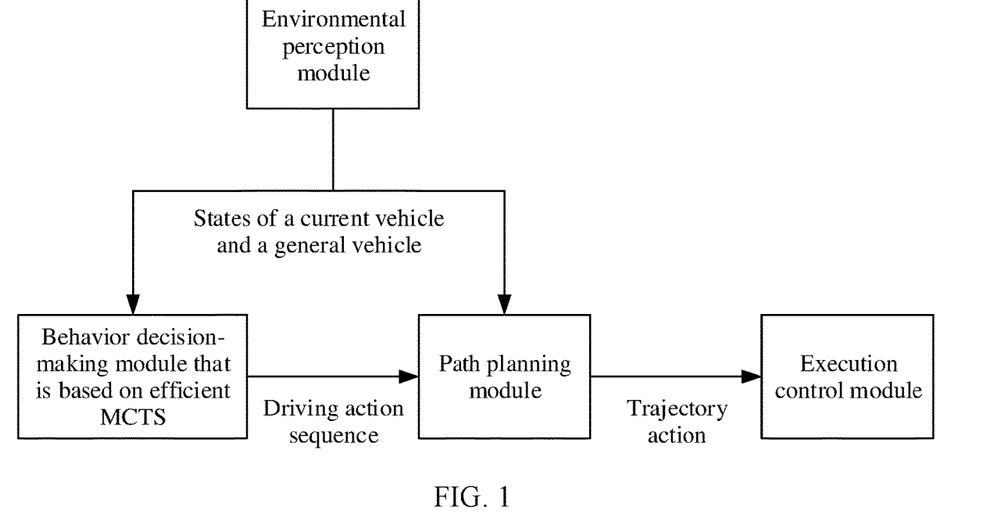
FIG. 1 is a schematic diagram of an autonomous driving system according to an embodiment of this description.

FIG. 1 is a schematic diagram of an autonomous driving system according to an embodiment of this description. The autonomous driving system includes an environmental perception module, a behavior decision-making module that is based on Monte Carlo tree search (MCTS), a path planning module, and an execution control module. The behavior decision-making module that is based on efficient MCTS is a core module for driving decision-making in this embodiment of this application.

The environmental perception module serves to perceive a state of an ambient environment, to obtain a current driving environment state of a current vehicle. Specifically, taking into consideration information transferred by each sensor, the environmental perception module determines a state of the current vehicle, including a location, a velocity, a course angle, and the like of the current vehicle, determines a state of an ambient environment, including information such as a location of a static target (such as a lane line, a road boundary, and a treelawn), a location and a velocity of a dynamic target (such as a general vehicle and a pedestrian), a road condition, and a weather condition (such as a temperature, humidity, and luminance), and sends the information to the path planning module and the behavior decision-making module that is based on efficient MCTS.

The behavior decision-making module that is based on efficient MCTS outputs, based on the current driving environment state of the current vehicle, a driving action sequence of a plurality of future steps.

The path planning module plans, based on states of the current vehicle and a general vehicle and the determined driving action sequence, a path trajectory that carries location and velocity information and that is used to complete the driving action sequence.

The execution control module outputs a reasonable control value by controlling the steering wheel, the accelerator, the brake pedal, and the like of the current vehicle, so that a driving trajectory of the current vehicle can follow the planned path trajectory.

The driving decision-making solution provided in embodiments of this application can be applied to an in-vehicle device, an autonomous driving vehicle, and the like that are equipped with the autonomous driving system shown in FIG. 1. In subsequent description of embodiments of this application, an autonomous driving vehicle equipped with the autonomous driving system shown in FIG. 1 is used as an example for description.

Before embodiments of this application are described, some terms used in this application are explained and described, to facilitate understanding for a person skilled in the art.

Figure 2:
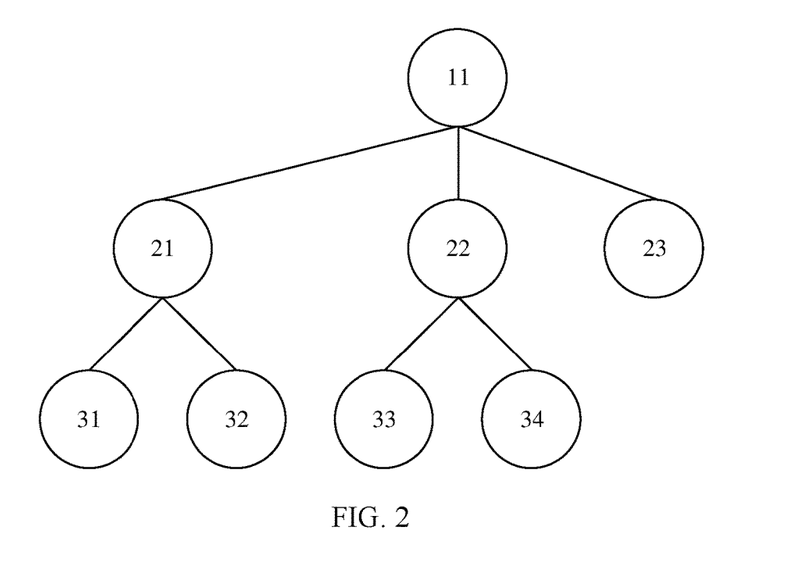
FIG. 2 is a schematic diagram of a tree-shaped structure according to an embodiment of this description.

(1) A tree-shaped structure (tree) is a data structure, and is a hierarchical set that includes n nodes, where n is usually a positive integer not less than 1. It is called a "tree" because it looks like an upside-down tree, which means that its root faces upward and its leaves face downward. A node without a subnode in the tree is a leaf node of the tree, and a topmost node of the tree is a root node. For example, in a tree-shaped structure shown in FIG. 2, a node 11 is located at the first layer of the tree; a node 21, a node 22, and a node 23 are located at the second layer of the tree; a node 31, a node 32, a node 33, and a node 34 are located at the third layer of the tree. The node 11 is a root node of the tree, the node 31, the node 32, the node 33, the node 34, and the node 23 are leaf nodes of the tree. A Monte Carlo tree in embodiments of this application is also a tree-shaped structure.

(2) Monte Carlo tree search (MCTS) is a heuristic search algorithm used in some decision-making processes, and is usually used in games to mainly serve a purpose of selecting a move with a highest success rate in a given game state. A major concept of Monte Carlo tree search is search, which is a group of downward traversal processes along a Monte Carlo tree (which is also known as a game tree). A single traversal path extends from the root node (namely a current game state) to a node that is not completely expanded. A node that is not completely expanded is a node that has at least one unaccessed (or unexpanded) subnode. When a node that is not completely expanded is encountered, an unaccessed subnode of the node is obtained through expansion. A corresponding initial value function of the subnode obtained through expansion is calculated based on a specific policy. The initial value function is also known as an initial value or a simulation result. Taking a board game as an example, on a basis of a composition represented by a subnode obtained through expansion, the game may be played based on a rollout policy until the game ends, to obtain a simulation result (for example, lose or win), which is an initial value function (for example, 0/1 if the game is lost, or 1/1 if the game is won) of the subnode. After the initial value function of the subnode is obtained, the initial value function is reversely propagated back to the root node of a current Monte Carlo tree, and the initial value function (the simulation result) of the subnode is added to all ancestor nodes of the subnode. For example, the initial value function of the subnode is 0/1 (which represents that the game is lost), 0/1 is added to value functions of all the ancestor nodes of the node. Once a search time or a maximum search step (namely a maximum number of nodes obtained through expansion starting from the root node) of the Monte Carlo tree is reached, the search stops, and a decision is made based on value function of each node in the Monte Carlo tree. It should be noted that, in the Monte Carlo tree, each node represents a state (which may also be referred to as a situation, for example, a composition in a board game), and statistical data is recorded for each node, for example, a value function or an access count of node. A value function recorded for a node may also be referred to as a value of node, which may be a specific numeric value.

Figure 3:
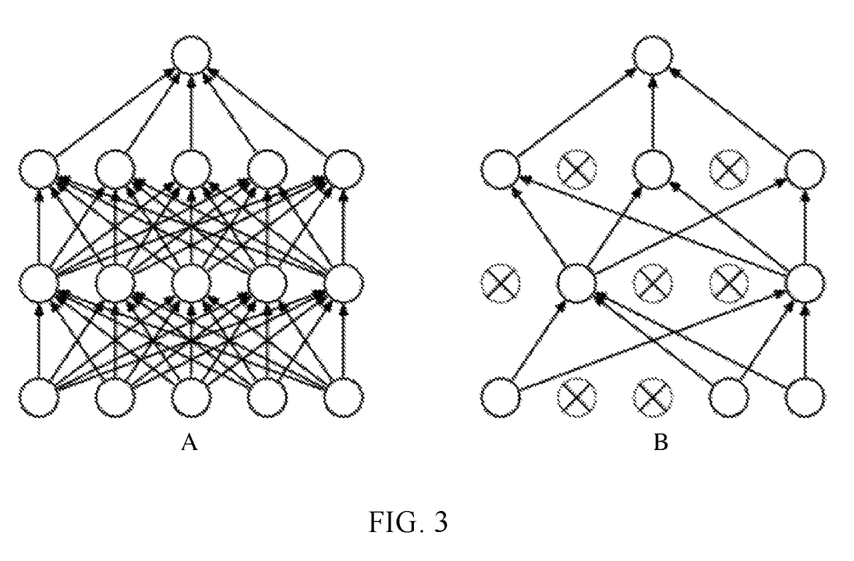
FIG. 3 is a schematic diagram of a dropout processing effect according to an embodiment of this description.

(3) Dropout means to drop some neurons in a model at a probability P. An output of a dropped neuron is set to zero. FIG. 3 is schematic diagram of a model that has undergone dropout processing. (A) in FIG. 3 is a schematic diagram of a model before dropout process, and (B) in FIG. 3 is a schematic diagram of the model that has undergone dropout processing. It can be learned that after the dropout processing, some neurons in the model are temporarily dropped and output zero.

In addition, it should be noted that, in embodiments of this application, "at least one" may also be described as one or more, and "a plurality of" may be two, three, four, or more. This is not limited in embodiments of this application. In embodiments of this application, "/" may represent an "or" relationship between associated objects. For example, A/B may represent A or B. "And/or" may be used to three relationships that may exist between associated objects. For example, "A and/or B" may represent the following three cases: Only A exists, both A and B exist, and only B exists. A and B may be in a singular or plural form. In embodiments of this application, terms such as "as an example" or "for example" are used to represent an example, an illustration, or a description. Any embodiment or design solution described "as an example" or "for example" should not be interpreted as more preferred or more advantageous than another embodiment or design solution. The use of terms such as "as an example" or "for example" is intended to present a related concept in a specific manner to facilitate understanding.

In embodiments of this application, a stochastic model of driving environments is used to predict various driving environment states that a plurality of driving actions of an autonomous driving vehicle may face in a future period of time, to build a Monte Carlo tree; and a driving action sequence most favorable for vehicle driving is determined based on the various driving environment states that the plurality of driving actions of the autonomous driving vehicle may face in the future period of time. This improves robustness of a driving decision-making policy and helps to ensure an optimal output decision-making result. In addition, an episodic memory may be further used to estimate an initial value function of a node in the Monte Carlo tree. This reduces calculation overheads brought by estimation of an initial value function of a node and improves efficiency of Monte Carlo tree search.

The following describes embodiments of this application with reference to accompanying drawing by using a lane change decision-making scenario as an example.

Figure 4:
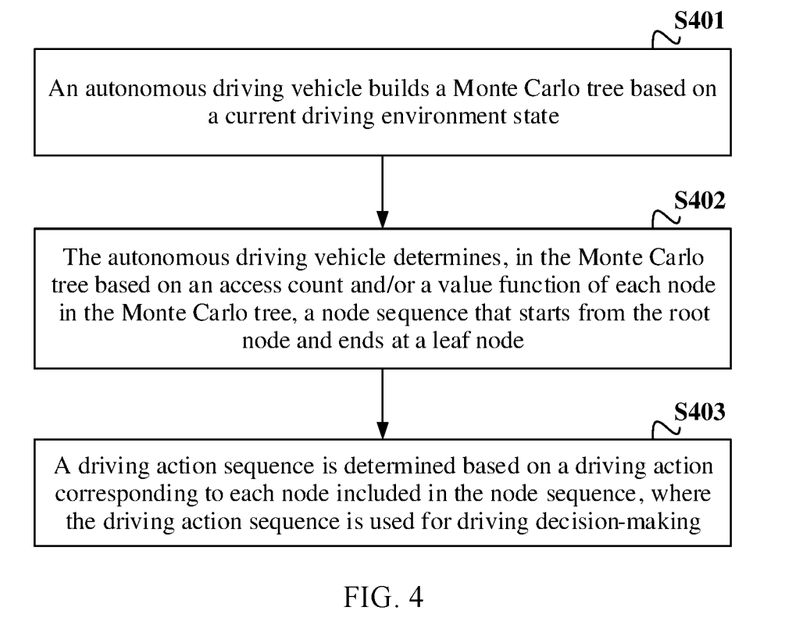
FIG. 4 is a schematic diagram of a driving decision-making process according to an embodiment of this description.

FIG. 4 is a schematic diagram of a driving decision-making process according to an embodiment of this description. The process includes the following steps.

S401: An autonomous driving vehicle builds a Monte Carlo tree based on a current driving environment state.

The Monte Carlo tree includes N nodes, each node represents one driving environment state, the N nodes include a root node and N−1 non-root nodes, the root node represents the current driving environment state, a driving environment state represented by a first node is predicted by using a stochastic model of driving environments based on a driving environment state represented by a parent node of the first node and based on a first driving action, the first driving action is a driving action determined by the parent node of the first node in a process of obtaining the first node through expansion, the first node is any node of the N−1 non-root nodes, and N is a positive integer greater than or equal to 2.

In the lane change decision-making scenario, an environment state of the autonomous driving vehicle may include a velocity of the autonomous driving vehicle, a relative velocity and a relative distance that are of a general vehicle in front (in a movement direction of the autonomous driving vehicle) of the autonomous driving vehicle and that are relative to the autonomous driving vehicle, a time-to-arrival (which is time required for catching up with the autonomous driving vehicle) of a general vehicle located behind (in a reverse direction of the movement direction of the autonomous driving vehicle) the autonomous driving vehicle, and the like. A driving environment state of the autonomous driving vehicle may include environment states of T historical moments that include a current moment, where T is a positive integer greater than or equal to 1. For example, the current moment is 10:00:00. The current driving environment state of the autonomous driving vehicle may include environment states of a total of eight historical moments of the autonomous driving vehicle: 9:56:30, 9:57:00, 9:57:30, 9:58:00, 9:58:30, 9:59:00, 9:59:30, and 10:00:00.

The environment state of the autonomous driving vehicle may be obtained by using an in-vehicle sensor of the autonomous driving vehicle. For example, the in-vehicle sensor of the autonomous driving vehicle includes a vehicle velocity sensor, an acceleration sensor, a distance sensor (for example, a radar distance sensor), and the like. The vehicle velocity sensor can measure a velocity of the autonomous driving vehicle, the acceleration sensor can measure an acceleration of the autonomous driving vehicle, and the distance sensor can measure a relative distance between the autonomous driving vehicle and a general vehicle. The autonomous driving vehicle may determine a relative velocity of a general vehicle to the current vehicle based on a relative distance change between the current vehicle and the general vehicle, and may determine a time-to-arrival of a general vehicle behind the current vehicle based on a relative distance of the general vehicle to the current vehicle and based on a relative velocity of general vehicle to the current vehicle.

In a possible implementation, the autonomous driving vehicle may further communicate with a general vehicle to obtain a relative velocity or relative distance of the general vehicle to the current vehicle. For example, the autonomous driving vehicle may receive velocity and location information sent by the general vehicle, and determine the relative velocity or relative distance of the general vehicle to the current vehicle based on velocity and location information of the current vehicle.

Figure 5:
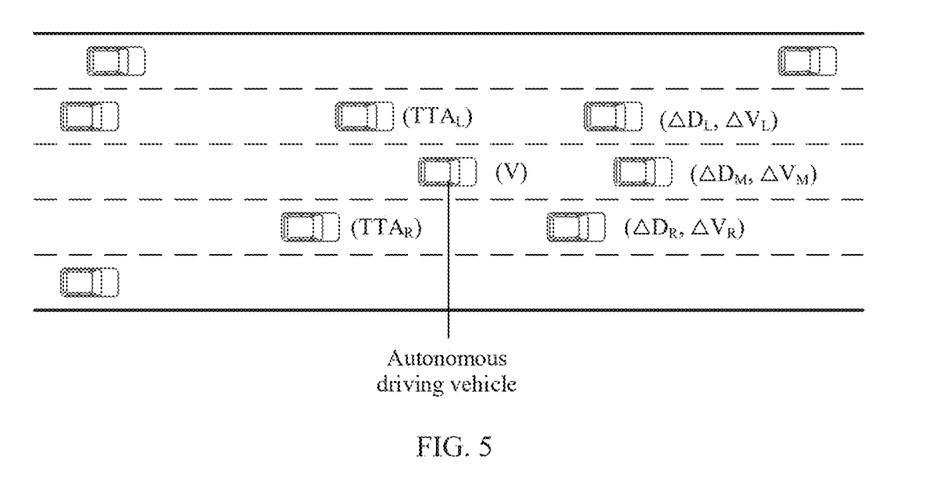
FIG. 5 is a schematic diagram of an environment in which an autonomous driving vehicle is located according to an embodiment of this description.

For example, the autonomous driving vehicle is located in an environment shown in FIG. 5 at a moment. The autonomous driving vehicle may obtain a relative distance ($\Delta D$) and a relative velocity ($\Delta V$), to the current vehicle, of a general vehicle in three lanes in front of the current vehicle; and obtain a time-to-arrival (TTA) of a general vehicle in three lanes behind the current vehicle, and a velocity of the current vehicle. In FIG. 5, L, M, and R respectively represent general vehicles in the left, middle, and right lanes of the autonomous driving vehicle. In this embodiment of this application, the environment states of the T historical moments corresponding to the current moment may be used use the current driving environment state. During driving decision-making, the autonomous driving vehicle may use the current driving environment state of the autonomous driving vehicle as the root node of the Monte Carlo tree to build the Monte Carlo tree. It is assumed that the autonomous driving vehicle is currently located in the environment shown in FIG. 5. The current driving environment state ($S_t$) of the autonomous driving vehicle may be represented as $S_t=(\Delta D_{i,\ t-T:t}, \Delta V_{i,\ t-T:t}, V_{t-T:t}, TTA_{j,\ t-T:t})$, where $i \in (L, M, R)$, $j \in (L, R)$, t represents the current moment, t-T:t represents the T historical moments corresponding to the current moment.

In the lane change decision-making scenario, a selectable driving action for the autonomous driving vehicle includes one or more of changing to a left lane, keeping a current lane, and changing to a right lane. Training of the stochastic model of driving environments may be implemented by collecting in advance driving environment states of a large quantity of vehicles before and after executing a driving action. Specifically, the driving environment states of a large quantity of vehicles before and after executing a driving action that are collected in advance and the executed driving action may be used as sample pairs, to build a training set for training the stochastic model of driving environments. Each sample pair in the training set may be represented as $(S_t+A_t, S_{t+1})$, where $A_t$ represents a driving action executed by a vehicle, which may be one of changing to a left lane, keeping a current lane, or changing to a right lane; $S_t$ represents a driving environment state before $A_t$ is executed, and $S_{t+1}$ represents a driving environment state after $A_t$ is executed.

It should be understood that, in embodiments of this application, a driving environment state of a vehicle before executing a driving action is usually a driving environment state of the vehicle when the vehicle starts executing the driving action, and a driving environment state of a vehicle after executing a driving action is usually a driving environment state of the vehicle when the vehicle completes executing the driving action. For example, a vehicle executes a driving action of changing to a left lane from 10:10:00 to 10:10:10. A driving environment state of the vehicle at 10:10:00 may be used as a driving environment state of the vehicle before executing the driving action of changing to a left lane, and a driving environment state of the vehicle at 10:10:10 may be used as a driving environment state of the vehicle after executing the driving action of changing to a left lane.

When the stochastic model of driving environments ($f_\theta(s,a,z)$) is trained, $S_t+A_t$ of a sample pair may be input to the stochastic model of driving environments, to obtain a driving environment state ($S_{t+1}'$) output by the stochastic model of driving environments after $A_t$ is executed based $S_t$. A loss of the stochastic model of driving environments may be calculated by using a loss function (loss function) based on $S_{t+1}'$ output by the stochastic model of driving environments and actual $S_{t+1}$. A higher loss indicates a larger difference between $S_{t+1}'$ output by the stochastic model of driving environments and actual $S_{t+1}$. The stochastic model of driving environments adjusts a parameter in the stochastic model of driving environments based on the loss, for example, updating a neuron parameter in the stochastic model of driving environments by using a stochastic gradient descent method. In this way, a process of training the stochastic model of driving environments becomes a process of minimizing the loss. The stochastic model of driving environments is continuously trained by using samples in the training set. When the loss is decreased to a value in a preset range, a trained stochastic model of driving environments is obtained. A latent variable z in the stochastic model of driving environments may be used to represent uncertainty of the model. Optionally, the stochastic model of driving environments may be a deep neural network, a Bayesian neural network, or the like.

The autonomous driving vehicle may predict, based on the trained stochastic model of driving environments and the current driving environment state, various driving environment states that a plurality of driving actions of the autonomous driving vehicle may face in a future period of time, to build the Monte Carlo tree. Specifically, the autonomous driving vehicle may start selecting a node by navigating through layers starting from the root node of the Monte Carlo tree. When a selected target node has one or more selectable driving actions that have not been predicted, one target driving action is selected. A driving environment state of the autonomous driving vehicle after executing the target driving action based on the target node is predicted by using the stochastic model of driving environments, and used as a driving environment state represented by a subnode of the target node, to expand the Monte Carlo tree.

In a possible implementation, to fully consider uncertainty of another general vehicle in the driving environment, when the driving environment state of the autonomous driving vehicle after executing the target driving action based on the target node is predicted by using the stochastic model of driving environments, a probability distribution of the driving environment state of the autonomous driving vehicle after executing the target driving action based on the target node is obtained through dropout-based forward propagation by using the stochastic model of driving environments, and a driving environment state is obtained through sampling from the probability distribution and used as the driving environment state of the autonomous driving vehicle after executing the target driving action based on the target node.

Figure 6:
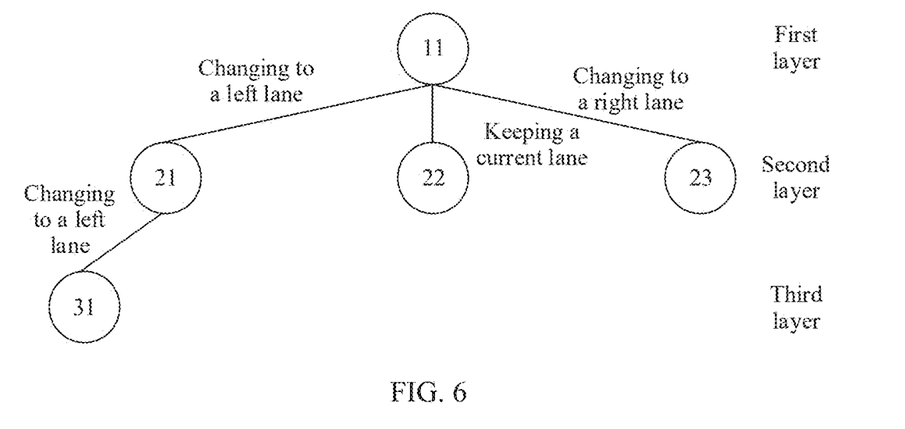
FIG. 6 is a first schematic diagram of a structure of a Monte Carlo tree according to an embodiment of this description.

For example, FIG. 6 shows an expanded Monte Carlo tree of an autonomous driving vehicle. The autonomous driving vehicle selects (for example, selects through layer-by-layer traversal) a node by navigating through layers starting from a root node 11 of the Monte Carlo tree, until a node 21. An unpredicted selectable driving action (A) of the node 21 includes changing to a left lane, keeping a current lane, or changing to a right lane. The autonomous driving vehicle may randomly select a target driving action from changing to a left lane, keeping a current lane, or changing to a right lane. For example, the target driving action randomly selected from changing to a left lane, keeping a current lane, or changing to a right lane is changing to a left lane ($A_t$). After selecting the target driving action, the autonomous driving vehicle predicts, through a plurality of times of dropout-based forward propagation based on the stochastic model of driving environments, a plurality of possible driving environment states after the target driving action ($A_t$) is executed on a basis of the node 21; and calculates, based on the plurality of possible driving environment states, an average value ($\mu$) and a variance ($\delta^2$) of predicted values of the driving environment states after $A_t$ is executed. A probability distribution $s'=N(\mu, \delta^2)$ of the values of the driving environment states after $A_t$ is executed is obtained through Gaussian sampling based on the average value and the variance, and a driving environment state after $A_t$ is executed is obtained through sampling (for example, randomly selecting one) from the probability distribution, to obtain a subnode (a node 31) of the node 21 through expansion.

After the subnode of the target node is obtained through expansion, the autonomous driving vehicle initializes statistical data, namely an access count (N) and a value function (Q), of the subnode. In other words, an initial access count and an initial value function of the subnode also need to be determined. The autonomous driving vehicle sets the initial access count of the subnode to 1, traces back from the subnode to the root node, and updates an access count of each node on a node path (search path) corresponding to the subnode. For example, the access count of each node on the node path corresponding to the subnode obtained through expansion increased by 1, that is, N=N'+1, where N is an updated access count, and N' is the access count before the update. In other words, an access count of each node in the Monte Carlo tree is a sum of access counts of all subnodes of the node and an initial access count of the node. It should be noted that in this application, a node path (search path) corresponding to a node is a node path that includes all ancestor nodes of the node. For example, after obtaining the subnode (the node 31) of the node 21, the autonomous driving vehicle updates an initial access count of the node 31 to 1, and increases access counts of both the node 21 and a node 11 on a node path (search path) of the node 31 by 1, to complete updating of the access count of each node on the node path corresponding to the node 31.

For the initial value function of the subnode obtained through expansion, the autonomous driving vehicle may determine the initial value function of the subnode based on an episodic memory (EM). If there is a record that is in the episodic memory and that corresponds to a driving environment state represented by the subnode, a value function that is stored in the episodic memory and that corresponds to driving environment state is directly output and used as the initial value function of the subnode. Otherwise, a first quantity of target driving environment states that have a highest matching degree with the driving environment state represented by the subnode may be selected from the episodic memory, and the initial value function of the subnode is determined based on value functions respectively corresponding to the first quantity of target driving environment states. The first quantity (K) may be 3, 5, or the like. For example, the autonomous driving vehicle may select, from the episodic memory, K target driving environment states that have a highest matching degree with the driving environment state represented by the subnode obtained through expansion; and use, as the initial value function of the subnode, an average value of value functions respectively corresponding to the K target driving environment states.

After the initial value function of the subnode obtained through expansion is determined, the autonomous driving vehicle traces back starting from the subnode to the root node, and updates a value function of each node on the node path corresponding to the subnode. For example, the autonomous driving vehicle updates, based on Q=Q'+$Q_L$, the value function of each node on the node path corresponding to the subnode, where Q is an updated value function of the node, Q' is the value function of the node before the update, and $Q_L$ is the initial value function of the subnode. In other words, a value function of each node in the Monte Carlo tree is a sum of value functions of all subnodes of the node and an initial value function of the node. In another possible implementation, alternatively, a value function of each node on the node path corresponding to the subnode may be updated based on Q=Q'+($Q_L$−Q')/N, where Q is an updated value function of the node, Q' is the value function of the node before the update, $Q_L$ is the initial value function of the subnode, and N is an updated access count of the node.

In this embodiment of this application, a maximum quantity of steps of the Monte Carlo tree may be limited. In other words, a maximum quantity of nodes obtained through expansion starting from the root node of the Monte Carlo tree is limited. For example, the maximum quantity of steps of the Monte Carlo tree is limited to 20. When the maximum quantity of steps is reached, expansion of the Monte Carlo tree stops. In addition, in this embodiment of this application, each time after a leaf node of the Monte Carlo tree is obtained through expansion (that is, a subnode of a node in the Monte Carlo tree is obtained through expansion), if a quantity of steps of the Monte Carlo tree does not meet the maximum quantity of steps of the Monte Carlo tree, a step of selecting a node by navigating through layers starting from the root node of the Monte Carlo tree is repeated, to continue to expand a leaf node of the Monte Carlo tree. A selection manner of selecting a node by navigating through layers starting from the root node of the Monte Carlo tree may be selecting, by navigating through layers based on a selection policy of an upper confidence bound apply to tree algorithm (UCT), a node (st+1) corresponding to a driving action. Compared with another selectable driving action, a selected driving action ($A_t$) maximizes a sum of a value function (Q) corresponding to the driving action and a weighted exploration item $C\sqrt{N''}/N$, so that the selected driving action achieves a balance between a node with the maximum value function and a node with a low access count, thereby ensuring that an optimal driving action is selected. Q is a value function of the selected node. In the weighted exploration item, C is a weight coefficient of the exploration item, N" is an access count of the selected node, and N is an access count of a leaf node that is of the selected node and that corresponds to a selectable action (A).

S402: The autonomous driving vehicle determines, in the Monte Carlo tree based on an access count and/or a value function of each node in the Monte Carlo tree, a node sequence that starts from the root node and ends at a leaf node.

In this embodiment of this application, a node sequence that starts from the root node and ends at a leaf node may be determined in the Monte Carlo tree according to one of a maximum access count rule, a maximum value function rule, or a "maximum access count first, maximum value function next" rule.

Figure 7:
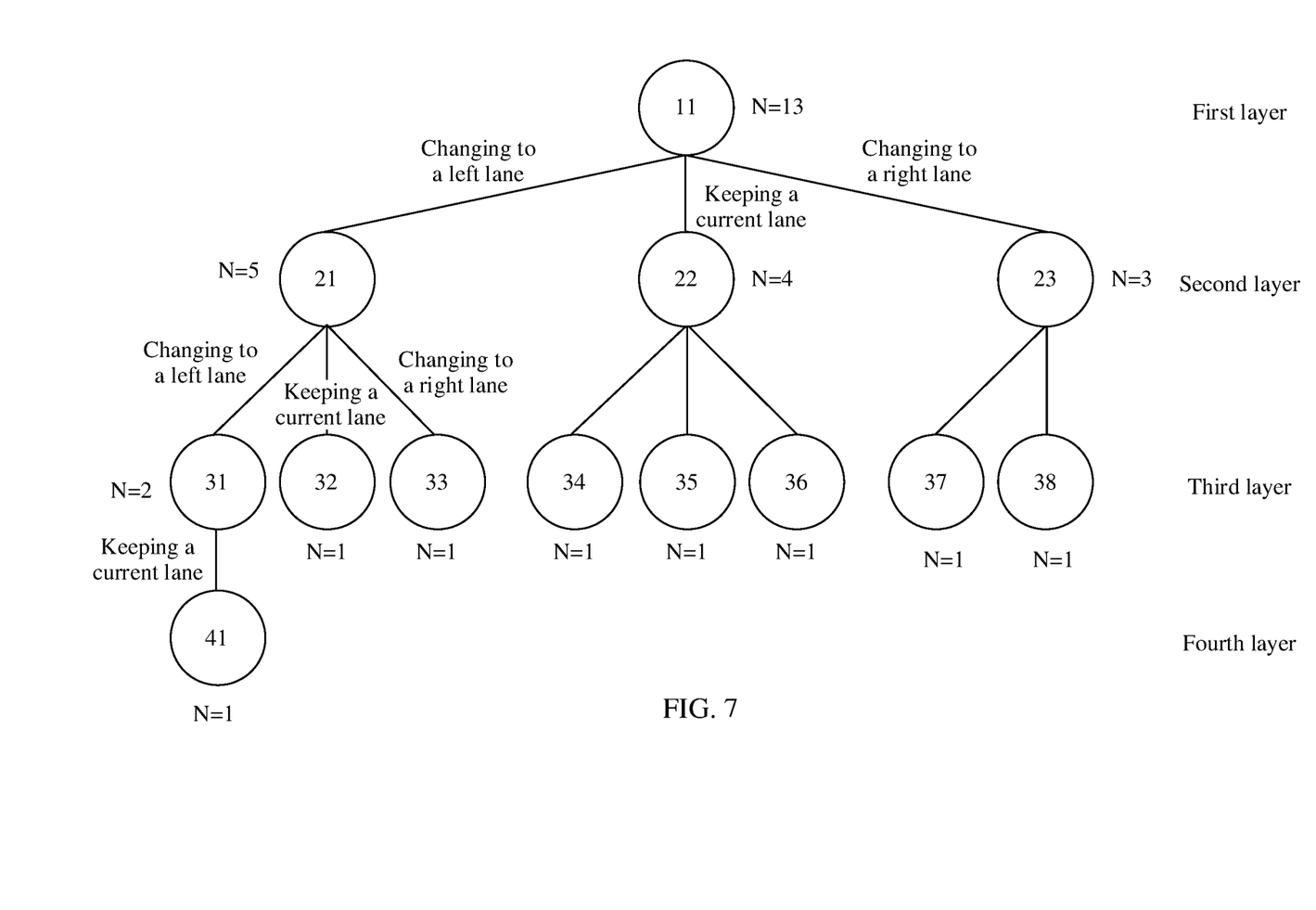
FIG. 7 is a second schematic diagram of a structure of a Monte Carlo tree according to an embodiment of this description.

For example, a node sequence that starts from the root node and ends at a leaf node is determined in the Monte Carlo tree according to the maximum access count rule. As shown in FIG. 7, starting from a node 11 (root node), a subnode with the maximum access count of the node 11 is a node 21, a subnode with the maximum access count of a node 21 is a node 31, and a subnode with the maximum access count of the node 31 is a node 41. A determined node sequence is node 11-node 21-node 31-node 41.

S403: A driving action sequence is determined based on a driving action corresponding to each node included in the node sequence, where the driving action sequence is used for driving decision-making.

In this embodiment of this application, a driving action corresponding to a node in the Monte Carlo tree is a driving action by which a parent node of the node obtains the node through expansion. The root node does not have a corresponding driving action. For example, as shown in FIG. 7, a driving action by which a parent node 11 of the node 22 obtains the node 22 through expansion is keeping a current lane. Then, a driving action corresponding to the node 22 is keeping a current lane. Using the determined node sequence node 11-node 21-node 31-node 41 as an example, a driving action sequence is changing to a left lane-changing to a left lane-changing to a left lane-keeping a current lane.

To ensure reliability of the stochastic model of driving environments, in a possible implementation, when the autonomous driving vehicle executes the first driving action in the driving action sequence, a driving environment state of the autonomous driving vehicle before executing the first driving action+the first driving action and a driving environment state after the first driving action is executed may be used as a new sample pair ($S_t$+$A_t$, $S_{t+1}$) and added to the training set, to update the stochastic model of driving environments.

For example, the stochastic model of driving environments may be updated in the following manner. A minimum batch of samples $\{(s_i, a_i, s'_i)\}_{i=1}^{M}$ is sampled from the new sample added to the training set, where M is a quantity of samples in the minimum batch of sample set, and (s,a,s') represents a sample set, for example, ($S_t$+$A_t$, $S_t$+1). A loss function of the stochastic model of driving environments is calculated, and the stochastic model of driving environments is updated based on a stochastic gradient descent method, to minimize an error between a value predicted by the stochastic model of driving environments and an actually perceived result. The loss function may be $$L(\theta, \phi) = \frac{1}{M}\sum_{i=1}^{M} \|f_\theta(s_i, a_i, z_i) - s'_i\|_2^2 + \lambda D_{KL}[q_\phi(z; s_i, s'_i)\|p(z)],$$

which includes two terms. The first term $\|f_\theta(s_i, a_i, z_i) - S'_i\|_2^2$ uses a mean-square error to represent an approximate error between a value $f_\theta(s_i,a_i,z_i)$ that the stochastic model of driving environments predicts for a driving environment state of the autonomous driving vehicle after executing a driving action and an actual observed value $s'_i$. The second term $\lambda D_{KL}[q_\phi(z;s_i,s'_i)\|p(z)]$ is a regularizer introduced for the latent variable z, to restrict a KL divergence between an estimated distribution $q_\phi(z;s_i, s'_i)$ and a prior hypothesis distribution p(z) of the latent variable z, thereby preventing overfitting. $\lambda$ is a proportionality coefficient for adjusting regularization strength.

After a driving episode ends, for example, the autonomous driving vehicle has arrived at a destination or the autonomous driving vehicle encounters an accident, after driving stops, the autonomous driving vehicle may obtain a return value based on whether the destination is reached or the like, and may determine an episodic trajectory sequence (in chronological order) based on an actual driving environment state after each driving action is executed in the driving episode. For each step in a reverse episodic trajectory sequence (in reverse order of the episodic trajectory sequence), the autonomous driving vehicle calculates, based on $R=\gamma R'+r$, a discounted cumulative return of a driving environment state and action pair $(S_t, A_t)$ corresponding to each driving environment state $(S_t)$ in the reverse episodic trajectory sequence, where $A_t$ is a driving action executed by the autonomous driving vehicle on a basis of $S_t$, R is a return value (namely a cumulative reward return value) of the driving environment state and action pair $(S_t, A_t)$, R' is a return value of a next driving environment state and action pair, $\gamma$ is a discounting factor, and r is a reward function obtained after the driving action $A_t$ is executed in the driving environment state $(S_t)$. If the driving environment state and action pair $(S_t, A_t)$ already exists in the episodic memory (EM), a value function in the EM is updated to R or a stored value, whichever is larger. Otherwise, the new sample pair $(S_t, A_t)$ and R are directly written into the EM, where R is a value function corresponding to the driving environment state $(S_t)$ in $(S_t, A_t)$.

The foregoing mainly describes the solution provided in this application from a perspective of method process. It can be understood that, to implement the foregoing functions, an apparatus may include a corresponding hardware structure and/or a software module that implements each function. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 8:
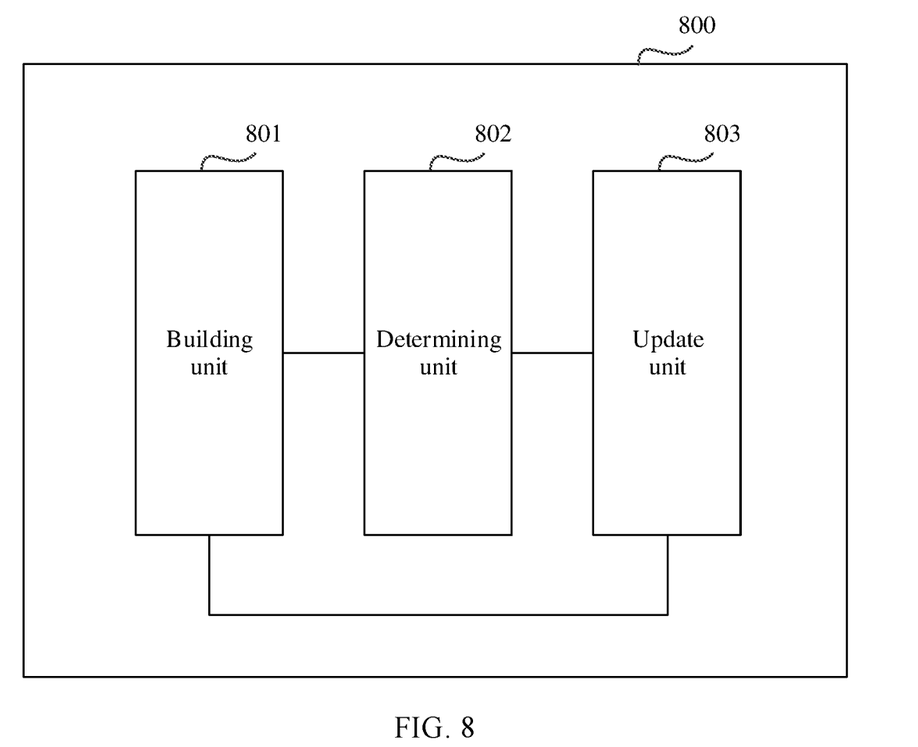
FIG. 8 is a first schematic diagram of a driving decision-making apparatus according to an embodiment of this description.

When an integrated unit is used, FIG. 8 is a block diagram of a possible example of a driving decision-making apparatus according to an embodiment of this application. The driving decision-making apparatus 800 may exist in a form of software. The driving decision-making apparatus 800 may include a building unit 801, a determining unit 802, and an update unit 803.

Specifically, in an embodiment, the building unit 801 is configured to build a Monte Carlo tree based on a current driving environment state, where the Monte Carlo tree includes N nodes, each node represents one driving environment state, the N nodes include a root node and N-1 non-root nodes, the root node represents the current driving environment state, a driving environment state represented by a first node is predicted by using a stochastic model of driving environments based on a driving environment state represented by a parent node of the first node and based on a first driving action, the first driving action is a driving action determined by the parent node of the first node in a process of obtaining the first node through expansion, the first node is any node of the N-1 non-root nodes, and N is a positive integer greater than or equal to 2; and The determining unit 802 is configured to determine, in the Monte Carlo tree based on an access count and/or a value function of each node in the Monte Carlo tree, a node sequence that starts from the root node and ends at a leaf node; and determine a driving action sequence based on a driving action corresponding to each node included in the node sequence, where the driving action sequence is used for driving decision-making.

The access count of each node is determined based on access counts of subnodes of the node and an initial access count of the node, the value function of each node is determined based on value functions of subnodes of the node and an initial value function of the node, the initial access count of each node is 1, and the initial value function is determined based on a value function that matches a driving environment state represented by the node.

In a possible design, when the driving environment state represented by the first node is predicted by using the stochastic model of driving environments based on the driving environment state represented by the parent node of the first node and based on the first driving action, the building unit 801 is specifically configured to: predict, through dropout-based forward propagation by using the stochastic model of driving environments, a probability distribution of a driving environment state after the first driving action is executed based on the driving environment state represented by the parent node of the first node; and obtain the driving environment state represented by the first node through sampling from the probability distribution.

In a possible design, when the initial value function of the node is determined based on the value function that matches the driving environment state represented by the node, the building unit 801 is specifically configured to: select, from an episodic memory, a first quantity of target driving environment states that have a highest matching degree with the driving environment state represented by the node; and determine the initial value function of the node based on value functions respectively corresponding to the first quantity of target driving environment states.

In a possible design, the update unit 803 is configured to: after the first driving action in the driving action sequence is executed, obtain an actual driving environment state after the first driving action is executed; and update the stochastic model of driving environments based on the current driving environment state, the first driving action, and the actual driving environment state after the first driving action is executed.

In a possible design, when determining, in the Monte Carlo tree based on an access count and/or a value function of each node in the Monte Carlo tree, a node sequence that starts from the root node and ends at a leaf node, the determining module is specifically configured to: determine, in the Monte Carlo tree based on the access count of each node in the Monte Carlo tree according to a maximum access count rule, a node sequence that starts from the root node and ends at a leaf node; determine, in the Monte Carlo tree based on the value function of each node in the Monte Carlo tree according to a maximum value function rule, a node sequence that starts from the root node and ends at a leaf node; or determine, in the Monte Carlo tree based on the access count and the value function of each node in the Monte Carlo tree according to a "maximum access count first, maximum value function next" rule, a node sequence that starts from the root node and ends at a leaf node.

In a possible design, the update unit 803 is further configured to: when a driving episode ends, determine a cumulative reward return value corresponding to an actual driving environment state after each driving action in the driving episode is executed; and update the episodic memory by using, as a value function corresponding to the actual driving environment state, the cumulative reward return value corresponding to the actual driving environment state after each driving action is executed.

Figure 9:
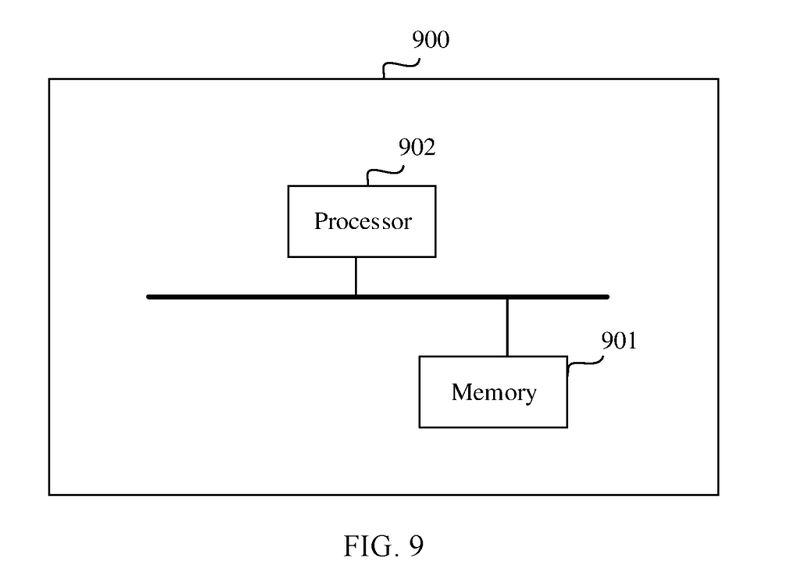
FIG. 9 is a second schematic diagram of a driving decision-making apparatus according to an embodiment of this description.

Based on the foregoing driving decision-making method, an embodiment of this application further provides a driving decision-making apparatus. As shown in FIG. 9, the driving decision-making apparatus 900 includes a memory 901 and a processor 902. The memory 901 and the processor 902 are connected to each other. Optionally, the memory 901 and the processor 902 may be connected to each other by using a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

When the driving decision-making apparatus 900 implements the driving decision-making method:

the memory stores a computer program or instructions; and the processor is configured to call the computer program or instructions stored in the memory to perform the following method: building a Monte Carlo tree based on a current driving environment state, where the Monte Carlo tree includes N nodes, each node represents one driving environment state, the N nodes include a root node and N−1 non-root nodes, the root node represents the current driving environment state, a driving environment state represented by a first node is predicted by using a stochastic model of driving environments based on a driving environment state represented by a parent node of the first node and based on a first driving action, the first driving action is a driving action determined by the parent node of the first node in a process of obtaining the first node through expansion, the first node is any node of the N−1 non-root nodes, and N is a positive integer greater than or equal to 2; determining, in the Monte Carlo tree based on an access count and/or a value function of each node in the Monte Carlo tree, a node sequence that starts from the root node and ends at a leaf node; and determining a driving action sequence based on a driving action corresponding to each node included in the node sequence, where the driving action sequence is used for driving decision-making.

The access count of each node is determined based on access counts of subnodes of the node and an initial access count of the node, the value function of each node is determined based on value functions of subnodes of the node and an initial value function of the node, the initial access count of each node is 1, and the initial value function is determined based on a value function that matches a driving environment state represented by the node.

In a possible design, that a driving environment state represented by a first node is predicted by using a stochastic model of driving environments based on a driving environment state represented by a parent node of the first node and based on a first driving action includes: predicting, through dropout-based forward propagation by using the stochastic model of driving environments, a probability distribution of a driving environment state after the first driving action is executed based on the driving environment state represented by the parent node of the first node; and obtaining the driving environment state represented by the first node through sampling from the probability distribution.

In a possible design, that the initial value function of a node is determined based on a value function that matches a driving environment state represented by the node includes: selecting, from an episodic memory, a first quantity of target driving environment states that have a highest matching degree with the driving environment state represented by the node; and determining the initial value function of the node based on value functions respectively corresponding to the first quantity of target driving environment states.

In a possible design, the method further includes: after the first driving action in the driving action sequence is executed, obtaining an actual driving environment state after the first driving action is executed; and updating the stochastic model of driving environments based on the current driving environment state, the first driving action, and the actual driving environment state after the first driving action is executed.

In a possible design, the determining, in the Monte Carlo tree based on an access count and/or a value function of each node in the Monte Carlo tree, a node sequence that starts from the root node and ends at a leaf node includes: determining, in the Monte Carlo tree based on the access count of each node in the Monte Carlo tree according to a maximum access count rule, a node sequence that starts from the root node and ends at a leaf node; determining, in the Monte Carlo tree based on the value function of each node in the Monte Carlo tree according to a maximum value function rule, a node sequence that starts from the root node and ends at a leaf node; or determining, in the Monte Carlo tree based on the access count and the value function of each node in the Monte Carlo tree according to a "maximum access count first, maximum value function next" rule, a node sequence that starts from the root node and ends at a leaf node.

In a possible design, the method further includes: when a driving episode ends, determining a cumulative reward return value corresponding to an actual driving environment state after each driving action in the driving episode is executed; and updating the episodic memory by using, as a value function corresponding to the actual driving environment state, the cumulative reward return value corresponding to the actual driving environment state after each driving action is executed.

As another form of this embodiment, a computer readable storage medium is provided, which stores a program or instructions. When the program or instructions are executed, the driving decision-making method in the foregoing method embodiment may be performed.

As another form of this embodiment, a computer program product including instructions is provided. When the instructions are executed, the driving decision-making method in the foregoing method embodiment may be performed.

As another form of this embodiment, a chip is provided. The chip may implement the driving decision-making method in the foregoing method embodiment.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. In this case, this application is intended to cover these modifications and variations provided that they fall within the scope of protection defined by the following claims and their equivalent technologies.

What is claimed is:

1. A driving decision-making method, comprising:
    obtaining, by an autonomous driving vehicle, information of a current driving environment state of the autonomous driving vehicle, wherein the autonomous driving vehicle includes one or more sensors;
    constructing, by the autonomous driving vehicle, a Monte Carlo tree based on the current driving environment state, wherein the Monte Carlo tree comprises N nodes, each node represents a corresponding driving environment state, the N nodes comprise a root node and N−1 non-root nodes, the root node represents the current driving environment state, a first driving environment state represented by a first node is predicted by using a stochastic model of driving environments based on a second driving environment state represented by a parent node of the first node and based on a driving action, the driving action is determined by the parent node of the first node in a process of obtaining the first node through expansion, the first node is any node of the N−1 non-root nodes, and N is a positive integer greater than or equal to 2;
    determining, by the autonomous driving vehicle, in the Monte Carlo tree based on at least one of an access count or a value function of each node in the Monte Carlo tree, a node sequence, wherein the node sequence comprises a plurality of nodes that starts from the root node and ends at a leaf node;
    in response to determining the node sequence, determining, by the autonomous driving vehicle, a driving action sequence of a plurality of future driving steps, wherein each future driving step in the driving action sequence comprises a driving action corresponding to each node comprised in the node sequence, and wherein the driving action sequence is used by the autonomous driving vehicle for driving decision-making;
    autonomously driving, by the autonomous driving vehicle, the autonomous driving vehicle based on a first driving action in the driving action sequence;
    obtaining, by the autonomous driving vehicle, an actual driving environment state after the first driving action is executed; and
    updating, by the autonomous driving vehicle, the stochastic model of driving environments based on the current driving environment state, the first driving action, and the actual driving environment state, wherein
    the access count of each node is determined based on access counts of subnodes of the each node and an initial access count of the each node, the value function of the each node is determined based on value functions of subnodes of the each node and an initial value function of the each node, the initial access count of the each node is 1, and the initial value function of the each node is determined based on a value function that matches the corresponding driving environment state represented by the each node.

2. The method according to claim 1, wherein that the first driving environment state represented by the first node is predicted by using the stochastic model of driving environments based on the second driving environment state represented by the parent node of the first node and based on the driving action comprises:
    predicting, through dropout-based forward propagation by using the stochastic model of driving environments, a probability distribution of a driving environment state after the driving action is executed based on the second driving environment state represented by the parent node of the first node; and
    obtaining the first driving environment state represented by the first node through sampling from the probability distribution.

3. The method according to claim 1, wherein that the initial value function of the node is determined based on the value function that matches the driving environment state represented by the node comprises:
    selecting, from an episodic memory, a first quantity of target driving environment states that have a highest matching degree with the driving environment state represented by the node; and
    determining the initial value function of the node based on value functions respectively corresponding to the first quantity of target driving environment states.

4. The method according to claim 3, wherein the method further comprises:
    when a driving episode ends, determining a cumulative reward return value corresponding to an actual driving environment state after each driving action in the driving episode is executed; and updating the episodic memory by using, as a value function corresponding to the actual driving environment state, the cumulative reward return value corresponding to the actual driving environment state after each driving action is executed.

5. The method according to claim 1, wherein the node sequence is determined:
based on the access count of the each node in the Monte Carlo tree according to a maximum access count rule;
based on the value function of the each node in the Monte Carlo tree according to a maximum value function rule; or
based on the access count and the value function of the each node in the Monte Carlo tree according to a "maximum access count first, maximum value function next" rule.

6. The method according to claim 1, wherein obtaining, by the autonomous driving vehicle, information of the current driving environment state of the autonomous driving vehicle comprises:
receiving, from a vehicle velocity sensor of the autonomous driving vehicle, a velocity of the autonomous driving vehicle.

7. The method according to claim 1, obtaining, by the autonomous driving vehicle, information of the current driving environment state of the autonomous driving vehicle comprises:
receiving, from an acceleration sensor of the autonomous driving vehicle, an acceleration of the autonomous driving vehicle.

8. The method according to claim 1, wherein obtaining, by the autonomous driving vehicle, information of the current driving environment state of the autonomous driving vehicle comprises:
receiving, from a distance sensor of the autonomous driving vehicle, a relative distance between the autonomous driving vehicle and another vehicle.

9. A driving decision-making apparatus in an autonomous driving vehicle, comprising:
at least one processor; and
one or more memories coupled to the at least one processor and storing programming instructions for execution by the at least one processor to:
obtain information of a current driving environment state of the autonomous driving vehicle, wherein the autonomous driving vehicle includes one or more sensors;
construct a Monte Carlo tree based on the current driving environment state, wherein the Monte Carlo tree comprises N nodes, each node represents a corresponding driving environment state, the N nodes comprise a root node and N−1 non-root nodes, the root node represents the current driving environment state, a first driving environment state represented by a first node is predicted by using a stochastic model of driving environments based on a second driving environment state represented by a parent node of the first node and based on a driving action, the driving action is determined by the parent node of the first node in a process of obtaining the first node through expansion, the first node is any node of the N−1 non-root nodes, and N is a positive integer greater than or equal to 2;
determine, in the Monte Carlo tree based on at least one of an access count or a value function of each node in the Monte Carlo tree, a node sequence, wherein the node sequence comprises a plurality of nodes that starts from the root node and ends at a leaf node;
in response to determining the node sequence, determine a driving action sequence of a plurality of future driving steps, wherein each driving future step in the driving action sequence comprises a driving action corresponding to each node comprised in the node sequence, and wherein the driving action sequence is used for driving decision-making;
autonomously drive the autonomous driving vehicle based on a first driving action in the driving action sequence;
obtain an actual driving environment state after the first driving action is executed; and
update the stochastic model of driving environments based on the current driving environment state, the first driving action, and the actual driving environment state, wherein
the access count of each node is determined based on access counts of subnodes of the each node and an initial access count of the each node, the value function of each node is determined based on value functions of subnodes of the each node and an initial value function of the each node, the initial access count of the each node is 1, and the initial value function of the each node is determined based on a value function that matches the corresponding driving environment state represented by the each node.

10. The apparatus according to claim 9, wherein the programming instructions are for execution by the at least one processor to:
predict, through dropout-based forward propagation by using the stochastic model of driving environments, a probability distribution of a driving environment state after the driving action is executed based on the second driving environment state represented by the parent node of the first node; and
obtain the first driving environment state represented by the first node through sampling from the probability distribution.

11. The apparatus according to claim 9, wherein the programming instructions are for execution by the at least one processor to:
select, from an episodic memory, a first quantity of target driving environment states that have a highest matching degree with the driving environment state represented by the node; and determine the initial value function of the node based on value functions respectively corresponding to the first quantity of target driving environment states.

12. The apparatus according to claim 11, wherein the programming instructions are for execution by the at least one processor to:
when a driving episode ends, determine a cumulative reward return value corresponding to an actual driving environment state after each driving action in the driving episode is executed; and
update the episodic memory by using, as a value function corresponding to the actual driving environment state, the cumulative reward return value corresponding to the actual driving environment state after each driving action is executed.

13. The apparatus according to claim 9, wherein the node sequence is determined:
based on the access count of the each node in the Monte Carlo tree according to a maximum access count rule;

based on the value function of the each node in the Monte Carlo tree according to a maximum value function rule; or based on the access count and the value function of the each node in the Monte Carlo tree according to a "maximum access count first, maximum value function next" rule.

14. A non-transitory computer-readable storage medium comprising a computer program or instructions which, when executed by a driving decision-making apparatus in an autonomous driving vehicle, cause the apparatus to perform operations comprising:

obtaining information of a current driving environment state of the autonomous driving vehicle, wherein the autonomous driving vehicle includes one or more sensors;

constructing a Monte Carlo tree based on the current driving environment state, wherein the Monte Carlo tree comprises N nodes, each node represents a corresponding driving environment state, the N nodes comprise a root node and N−1 non-root nodes, the root node represents the current driving environment state, a first driving environment state represented by a first node is predicted by using a stochastic model of driving environments based on a second driving environment state represented by a parent node of the first node and based on a driving action, the driving action is determined by the parent node of the first node in a process of obtaining the first node through expansion, the first node is any node of the N−1 non-root nodes, and N is a positive integer greater than or equal to 2;

determining, in the Monte Carlo tree based on at least one of an access count or a value function of each node in the Monte Carlo tree, a node sequence, wherein the node sequence comprises a plurality of nodes that starts from the root node and ends at a leaf node;

in response to determining the node sequence, determining a driving action sequence of a plurality of future driving steps, wherein each future driving step in the driving action sequence comprises a driving action corresponding to each node comprised in the node sequence, and wherein the driving action sequence is used for driving decision-making;

autonomously driving the autonomous driving vehicle based on a first driving action in the driving action sequence;

obtaining an actual driving environment state after the first driving action is executed; and updating the stochastic model of driving environments based on the current driving environment state, the first driving action, and the actual driving environment state, wherein the access count of each node is determined based on access counts of subnodes of the each node and an initial access count of the each node, the value function of the each node is determined based on value functions of subnodes of the each node and an initial value function of the each node, the initial access count of the each node is 1, and the initial value function of the each node is determined based on a value function that matches the corresponding driving environment state represented by the each node.

15. The non-transitory computer-readable storage medium according to claim 14, wherein that the first driving environment state represented by the first node is predicted by using the stochastic model of driving environments based on the second driving environment state represented by the parent node of the first node and based on the first driving action comprises:

predicting, through dropout-based forward propagation by using the stochastic model of driving environments, a probability distribution of a driving environment state after the first driving action is executed based on the second driving environment state represented by the parent node of the first node; and obtaining the first driving environment state represented by the first node through sampling from the probability distribution.

16. The non-transitory computer-readable storage medium according to claim 14, wherein that the initial value function of the node is determined based on the value function that matches the driving environment state represented by the node comprises:

selecting, from an episodic memory, a first quantity of target driving environment states that have a highest matching degree with the driving environment state represented by the node; and determining the initial value function of the node based on value functions respectively corresponding to the first quantity of target driving environment states.

17. The non-transitory computer-readable storage medium according to claim 16, wherein the operations further comprise:

when a driving episode ends, determining a cumulative reward return value corresponding to an actual driving environment state after each driving action in the driving episode is executed; and updating the episodic memory by using, as a value function corresponding to the actual driving environment state, the cumulative reward return value corresponding to the actual driving environment state after each driving action is executed.

18. The non-transitory computer-readable storage medium according to claim 14, wherein the node sequence is determined:

based on the access count of the each node in the Monte Carlo tree according to a maximum access count rule;

based on the value function of the each node in the Monte Carlo tree according to a maximum value function rule; or based on the access count and the value function of the each node in the Monte Carlo tree according to a "maximum access count first, maximum value function next" rule.

* * * * *